UNITED STATES PATENT OFFICE.

JONAS W. AYLSWORTH, OF EAST ORANGE, NEW JERSEY, ASSIGNOR, BY DIRECT AND MESNE ASSIGNMENTS, TO CONDENSITE COMPANY OF AMERICA, OF EAST ORANGE, NEW JERSEY, A CORPORATION OF NEW JERSEY.

ENAMEL LACQUER OR VARNISH.

1,098,608. Specification of Letters Patent. Patented June 2, 1914.

No Drawing. Application filed February 11, 1910. Serial No. 543,239.

*To all whom it may concern:*

Be it known that I, JONAS W. AYLSWORTH, a citizen of the United States, and a resident of East Orange, in the county of Essex and State of New Jersey, have invented a certain new and useful Enamel Lacquer or Varnish, of which the following is a description.

My invention relates to a new composition of matter which is adapted especially for use as an enamel lacquer or varnish or as an ingredient of the same, and my object is the production of such a composition and an improved process for the formation of the same.

While my improved composition is adapted especially for use in the production of a varnish or enamel which hardens on subsequent heat treatment, it also, in its broad aspects, forms the basis for an improved composition suitable for forming a cement for pipe joints and the like, which I have described and claimed in Patent No. 1,065,495, granted June 24, 1913. In this application, I will claim my improved composition in terms sufficiently broad to cover the same in its broadest aspects as applied either to a cement or a varnish, and will also append claims to the composition as adapted particularly to the manufacture of the varnish or enamel and process for making the same. My invention contemplates such an enamel as is adapted to be formed on metals and wood, to form a hard surface on cardboard, fabric, paper, leather, etc., to form a surface adapted for embossing operations, making negative matrices for engraving and printing, forming a hard surface suitable for molding sound records, and incorporating with various inert pulverized materials and pigments to form veneers for wood. It also is adapted to be incorporated with woven fabrics or paper to form bindings for books, and in the manufacture of a variety of articles.

My invention comprises broadly a fusible resin of phenolic origin, which has mixed therewith a substance which is adapted to react with the resin upon the application of sufficient heat to form a hard insoluble condensation product.

More specifically, my invention comprises a varnish resin which is soluble in the usual solvents of shellac, and which may range from pale amber to various shades of transparent brown in color, and which hardens on the application of heat at a temperature of from 170 to 220 degrees F., or higher. the varnish upon heating, as described, forms a refractory enamel more refractory than ebonite or hard rubber, and almost equaling ivory in hardness and strength. It is at the same time more capable than are the substances mentioned of withstanding the action of chemical agents and heat.

My improved varnish composition is formed by the incorporation of substances containing the methylene radical $CH_2$, preferably hexa-methylene-amin or hexa-methylene-tetra-amin, as it is sometimes called $(CH_2)_6N_4$ with a phenol resin, such as is described in my application Serial No. 496,060, plastic composition and process of manufacturing the same, filed May 14, 1909, and Patent No. 1,029,737, granted June 18, 1912. Or, in place of hexa-methylene-tetra-amin, I may use the product obtained by reacting upon aqueous solutions of ammonia with formaldehyde or polymers thereof, which product may contain other methylene-amins, as explained in my Patent No. 1,020,593, granted March 19, 1912. Various of the so-called shellac substitutes of phenolic or cresolic origin may however be substituted for the phenol resin referred to above, with good results, in many of the uses of enamel. The resin or shellac substitute and the methylene-amin are dissolved in a suitable solvent such as alcohol, acetone or equivalent solvent. The methylene-amin compound performs the function of reacting with the fusible phenol condensation product or phenol resin upon the application of sufficient heat to harden the same by transforming it into an infusible final condensation product, as is described in my Patent No. 1,020,593, referred to. This result is apparently accomplished by the union of the methylene radical contained in the methylene-amin with the phenol resin, the nitrogen component of the hardening ingredient uniting with hydrogen from the phenol resin to form ammonia, which remains in unstable combination within the mass, or which may be evolved by heat. This ammonia is evolved with comparative ease. The hexa-methylene-amin or other methylene-amin compound seems to be the most suitable hardening substance which can be used, although other substances containing the methylene radical, as formaldehyde, trioxymethylene, etc., may be used. With the methylene-amin compounds, however, there is never any danger of losing any of the same by evolution as gas, if the composition is to remain for some time before its application and hardening by heat treatment, since the methylene-amin only gives up its methylene by combination with such a substance as the phenol resin upon heat treatment.

I prefer, as I have stated, to use the particular phenol resin described in my application Ser. No. 496,060, referred to, and Patent No. 1,029,737, rather than any of the "shellac substitutes" mentioned, for mixture with the hardening agent, and for many purposes the mixture with this described resin has particular advantages. My phenol resin, as described in the said application, is a fusible, soluble, phenol-formaldehyde condensation product, in which the formaldehyde is all combined with the phenol, and there is no free phenol, or only a small, ascertainable amount. This resin is a final product, in the sense that it cannot be transformed into the infusible insoluble product by any amount of heating, at any temperature, either alone or with basic or acid condensing agents. It is preferably completely dehydrated by heating to about 400° F. It is preferably formed without the use of any condensing agent. When hexa-methylene-tetra-amin or a solid anhydrous polymerized formaldehyde like tri-oxymethylene is used as the hardening agent, it should be noted that this ingredient also is anhydrous.

The ingredients may be separately dissolved in the solvent and mixed, or they may be dissolved together. Or, the mythylene-amin and the phenol resin may be mixed while the resin is in fused condition at from 200 to 230 degrees F. without the use of a solvent. This mixture may then be rolled when it has cooled sufficiently to become pasty into thin sheets or laminæ suitable for being dissolved in the solvent, or the material may be formed in thin sheets by other means. The last described form of the composition is desirable for many uses, as it may be sold and transported in dry state in rolls, the purchaser or user dissolving the same in a suitable solution when he is ready to apply the composition in the same manner as shellac is transported and used. The composition formed with a methylene-amin compound may be kept indefinitely in solution in closed receptacles without harmful change. It is non-corrosive to metals either in solution or dry, and forms an efficient preservative coating for metals to prevent oxidation and other corrosive actions.

When the methylene-amin compound is mixed with the phenol resin in the fused state, the mixing and rolling of the material are carried out without change of the material into the hard infusible product, since the hardening reaction does not take place immediately, but is gradual at the temperature required for the mixing of the ingredients. Hardening of the film of varnish or enamel after evaporation of the solvent takes place at quite moderate temperatures and is greatly accelerated by increased temperatures. This hardening requires no compensating pressure to prevent frothing or the formation of bubbles, and the film is formed without cracks or other defects due to the evolution of gas during the final reaction of the ingredients. The varnish or enamel may be hardened by passing any body which gives out radiant heat over the surface of the enamel film close to the same, but not in contact therewith. Thus, a heated flat iron, electric heater, or similar heating device, may be used.

Suitable proportions of the liquid enamel or varnish are 100 parts of phenol resin, 8 to 10 parts of hexa-methylene-amin, 100 to 500 parts of solvent which may be wood alcohol, methylated spirits, grain alcohol, denatured alcohol, acetone, or mixtures of the same with each other or with small percentages of water.

When the liquid enamel or lacquer is designed to be used as a protective coating on metal, the proportion of the hexa-methylene-amin may be reduced to from 4 to 6 parts to 100 parts of the phenol resin. When the liquid enamel or lacquer is designed to be used as a film applied to a suitable backing to be embossed or shaped after evaporation of the solvent and hardening by heat, a solid solvent ingredient such as those mentioned in application Serial No. 496,060, or Patent No. 1,020,593, above referred to, may be added in percentages which may be varied between 5 and 25 per cent., dependent upon the particular use desired, the nature of the solid solvent and its solubility in the volatile solvent used in the lacquer. The solid solvents mentioned in application Ser. No. 496,060, as there described are termed "final product solvents" by which term are included only such substances as will dissolve the ultimate condensation product or combine therewith at the baking temperature, render it plastic at such temperature, and remain as a part of the product in the condition of solid solution, both when the ultimate product is hot and when it is cold. Among the examples of this class which may be mentioned are naphthalene and some of its derivatives, such as nitro and chloro derivatives, especially the mono-nitro and di-nitro and mono-chloro and tetra-chloro naphthalenes, di-nitro benzene, preferably the meta variety, acetanilid, ricinoleic acid and ricinelaidic acid and their anhydrids, benzoic acid and anhydrid, and di-phenylamin.

As stated, my invention comprises the material described as an enamel or lacquer or ingredient for the same and the process for making the same, and it also comprises the substance broadly as a new composition of matter comprising a fusible phenol resin having mixed therein a small percentage of a substance which combines with the resin on application of sufficient heat to harden it, together with a suitable solvent, if desired. As I have stated, this composition also forms the basis of an improved cement which I describe and claim in Patent No. 1,065,495, above referred to.

Having now described my invention, what I claim and desire to protect by Letters Patent is as follows:

1. A new composition of matter comprising a mixture of a fusible soluble phenol resin which is anhydrous and contains substantially no free formaldehyde or equivalent and a substance which is soluble in common solvents and is capable of combining with the said resin on application of heat to harden the same to infusibility and insolubility, the said resin being characterized by its incapability of transformation into an infusible and insoluble body, when not mixed with such a substance, substantially as described.

2. A new composition of matter comprising a mixture of a fusible soluble phenol-formaldehyde condensation product containing substantially no free formaldehyde, and hexa-methylene-tetra-amin, capable of combining with said product on application of heat, and sufficient in quantity to harden said product to infusibility and insolubility, by combination therewith, substantially as described.

3. A new composition of matter comprising a mixture of a fusible soluble phenol resin, a normally non-volatile solid solvent ingredient, and a substance which is soluble in common solvents and is capable of combining with the said resin on application of heat to harden the same to infusibility and insolubility, the said resin being characterized by its incapability of transformation into an infusible and insoluble body, when not mixed with such a substance, substantially as described.

4. A new composition of matter comprising a mixture of a fusible soluble, anhydrous phenol resin, and an anhydrous methylene-containing substance, substantially as described.

5. A new composition of matter comprising a mixture of a fusible, soluble phenol resin, hexa-methylene-tetra-amin, and a solid solvent ingredient, substantially as described.

6. A new composition of matter comprising a mixture of a fusible, soluble anhydrous non-condensing-agent-containing phenol resin, and a substance which is soluble in common solvents and is capable of combining with the said resin on application of heat to harden the same to infusibility and insolubility, substantially as described.

7. As a new article of manufacture, an ingredient adapted to be dissolved in a suitable solvent to form a hard varnish or lacquer on subsequent heating, comprising a fusible phenol resin having mixed therein a small percentage of hexa-methylene-tetra-amin and formed in thin sheets, substantially as described.

8. As a new article of manufacture, an ingredient adapted to be dissolved in a suitable solvent to form a hard varnish or lacquer on subsequent heating, comprising a fusible phenol resin having mixed therein a small percentage of hexa-methylene-tetra-amin and a solid solvent ingredient, and formed in thin sheets, substantially as described.

9. The process of preparing an ingredient for a varnish or enamel composition which consists in preparing without the use of a condensing agent a fusible soluble phenol resin which is incapable of transformation into an infusible and insoluble body, when not mixed with an added hardening agent, and which resin is anhydrous and contains substantially no free formaldehyde or equivalent, and mixing the same thoroughly with a substance which is soluble in common solvent and is capable of combining with said resin on application of sufficient heat to harden the same to infusibility and insolubility, the mixture being made under such conditions as not to cause the said hardening reaction, substantially as described.

10. The process of preparing an ingredient for a varnish or enamel composition which consists in preparing a fusible soluble anhydrous phenol resin, and mixing the same thoroughly with an anhydrous methylene-containing hardening agent therefor, under such conditions as not to cause the said agent to react with the said resin during the mixture, substantially as described.

11. The process of preparing an ingredient for a varnish or enamel composition which consists in preparing a fusible soluble phenol resin which is incapable of transformation into an infusible and insoluble body, when not mixed with an added hardening agent, and mixing the same thoroughly with a small amount of hexa-methylene-tetra-amin, under such conditions as not to cause reaction in the mixture between the said substances, substantially as described.

12. The process of preparing an ingredient for varnish adapted to be dissolved in a suitable solvent and subsequently hardened by heating, which consists in mixing a small percentage of hexa-methylene-tetra-amin with a phenol resin in fused condition, permitting the substance to become pasty, and rolling in thin sheets, substantially as described.

13. The process of preparing an ingredient for varnish adapted to be dissolved in a suitable solvent and subsequently hardened by heating, which consists in mixing with a phenol resin in fused condition a small percentage of a substance which reacts with the same on application of sufficient heat to form a hard product, and withdrawing the heat before the substance has hardened, substantially as described.

14. The process of preparing an ingredient for varnish adapted to be dissolved in a suitable solvent and subsequently hardened by heating, which consists in mixing with a phenol resin in fused condition a small percentage of a substance which reacts with the same on application of sufficient heat to form a hard product, and with an ingredient which acts as a solid solvent for the subsequently hardened varnish composition when cold, and withdrawing the heat before the substance has hardened, substantially as described.

This specification signed and witnessed this 8th day of February 1910.

JONAS W. AYLSWORTH.

Witnesses:
DYER SMITH,
JOHN M. CANFIELD.